US012782100B2

(12) United States Patent
Thomas, III et al.

(10) Patent No.: US 12,782,100 B2
(45) Date of Patent: Nov. 3, 2026

(54) THREE-DIMENSIONAL TOPOGRAPHICAL SURFACE CAPTURE DEVICE

(71) Applicant: Hewlett-Packard Development Company, L.P., Spring, TX (US)

(72) Inventors: Fred Charles Thomas, III, Fort Collins, CO (US); Joshua Alan St. John, San Diego, CA (US); Santiago Garcia-Reyero Vinas, San Diego, CA (US); Owen P. Columbus, Spring, TX (US); Christian M. Damir, Fort Collins, CO (US)

(73) Assignee: Hewlett-Packard Development Company, L.P., Spring, TX (US)

(*) Notice: Subject to any disclaimer, the term of this patent is extended or adjusted under 35 U.S.C. 154(b) by 212 days.

(21) Appl. No.: 18/842,746

(22) PCT Filed: Mar. 31, 2022

(86) PCT No.: PCT/US2022/022838
§ 371 (c)(1),
(2) Date: Aug. 29, 2024

(87) PCT Pub. No.: WO2023/191791
PCT Pub. Date: Oct. 5, 2023

(65) Prior Publication Data
US 2025/0180344 A1 Jun. 5, 2025

(51) Int. Cl.
*G01B 5/00* (2006.01)
*G01B 11/24* (2006.01)
*G06V 10/60* (2022.01)

(52) U.S. Cl.
CPC .......... *G01B 5/0004* (2013.01); *G06V 10/60* (2022.01)

(58) Field of Classification Search
CPC .. G01B 5/0004; G01B 11/24; G01B 11/2513; G01B 11/2441; G01B 11/303; G01B 11/25; G01B 11/0608; G01B 11/2545; G06V 10/60; G06V 20/64; G06V 10/147; G06V 40/1324; A61B 1/00193; A61B 5/1172; A61B 3/0083; A61B 3/0033; A61B 1/00149; A61B 3/10; G03B 15/05; G06T 7/586; G06T 7/0073; G06T 7/32;
(Continued)

(56) References Cited

U.S. PATENT DOCUMENTS

| | | | | |
|---|---|---|---|---|
| 10,810,762 B2 * | 10/2020 | Seki | ..................... | H04N 13/246 |
| 2021/0274075 A1 * | 9/2021 | Rohaly | .................. | G01B 11/30 |
| 2021/0378549 A1 * | 12/2021 | Hilton | .................. | A61B 5/1077 |

* cited by examiner

*Primary Examiner* — Brandi N Hopkins
(74) *Attorney, Agent, or Firm* — Quarles & Brady LLP

(57) ABSTRACT

A three-dimensional (3D) topographical surface capture device includes a housing, light sources mounted around a perimeter of the housing, and an imaging subassembly including a polarization-state viewer and an image capture sensor directed inward into the housing. The device further includes control circuitry to control the light sources and the imaging subassembly to capture two-dimensional (2D) topographical surface images from multiple lighting orientations of a sample at a bottom end of the housing and to synthesize a 3D topographical surface image of the sample from the 2D topographical surface images. The device is switchably configured between a first mode in which a tray is attached to the bottom end of the housing and the sample is attached to the tray, and a second mode in which the tray is removed and the bottom end of the housing is placed to abut the sample.

20 Claims, 6 Drawing Sheets

(58) Field of Classification Search
CPC .. G06T 5/50; G01N 21/6456; G01N 29/2418; G02B 21/084; G01J 3/2823; G01J 1/4228; G01H 9/00; H04N 13/0203; H04N 13/232; G01Q 60/22; G06K 9/00255; G06K 9/00013; H01S 5/18361
See application file for complete search history.

THREE-DIMENSIONAL TOPOGRAPHICAL SURFACE CAPTURE DEVICE

BACKGROUND

Physically based rendering (PBR) is an approach to synthesize three-dimensional (3D) topographical surface images of samples. PBR can employ photometric stereo imaging techniques, for instance. In photometric stereo imaging, two-dimensional (2D) images of a sample are captured under different lighting conditions. From these multiple 2D images, a 3D topographical surface image of the sample can be synthesized. In addition, surface reflective meta data may be synthesized for image rendering of surface reflections in which the orientation and color of a changing illuminating light source is correctly accounted.

DETAILED DESCRIPTION

As noted in the background, physically based rendering (PBR) provides for the synthesis of three dimensional (3D) topographical surface images of samples, and be realized via photometric stereo imaging techniques. Existing 3D topographical surface capture devices that employ photometric stereo imaging techniques include a chamber in which a sample is placed. Lighting conditions to which the sample is subjected can therefore be tightly controlled and multiple two-dimensional (2D) images captured under different lighting conditions from which a 3D topographical surface image of the sample can be synthesized. The devices are generally under the control of a host computing device.

While such 3D topographical surface capture devices work well enough for samples that are sufficiently small and portable to be placed in the chambers, they are as a general rule unusable for large and/or immovable samples. Samples may be so large, for instance, that they cannot be placed in the chambers of even the largest 3D topographical surface capture devices. Furthermore, even small samples that can fit in the chambers may not be able to be moved for placement within the chambers. A priceless artifact in a museum, for example, may not be permitted to be physically handled for placement within the chamber of an existing 3D topographical surface capture device.

Techniques described herein pertain to a 3D topographical surface capture device that alleviates these and other shortcomings of existing such capture devices. The described capture device is portable and can be independently operated in two modes without requiring communicative or conductive connection with any other device. In a first mode, a sample is placed in a tray that is then attached to the bottom of the device. Light sources and an imaging subassembly internal to the device are then controlled to generate a 3D topographical surface image of the sample using photometric stereo imaging techniques.

In a second mode, the tray is removed from the bottom of the 3D topographical surface capture device. The capture device may be attached to a mount so that the bottom of the device can be placed in such a way to abut a sample. The light sources and the imaging subassembly are then controlled as before to generate a 3D topographical surface image of the sample using photometric stereo imaging techniques. In this second mode, then, the sample does not have to be moved inside or to the capture device, and thus can be large and/or immovable. Instead, the capture device is moved to the location of the sample.

Figure 1A:
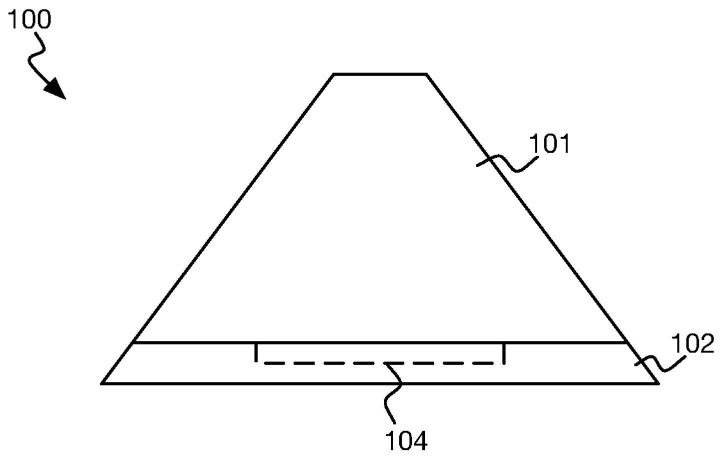
FIGS. 1A and 1B are diagrams depicting two different example modes of operation of a three-dimensional (3D) topographical surface capture device.
Figure 1B:
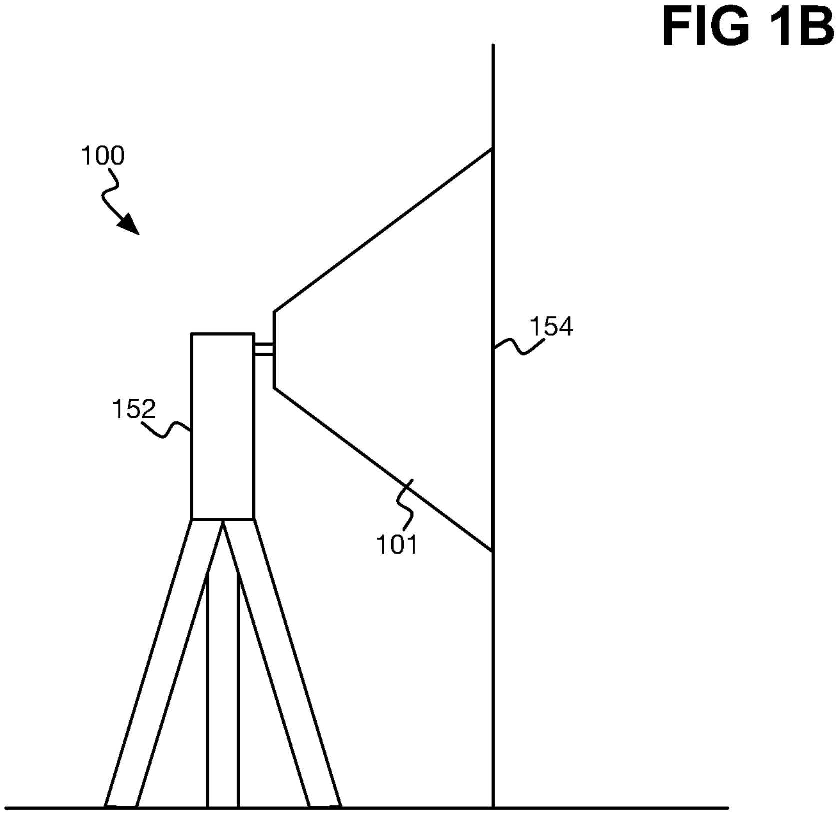

FIGS. 1A and 1B show example operation of a 3D topographical surface capture device 100 in two different modes. In the mode of example operation of FIG. 1A, a sample 104 is placed within a tray 102 of the capture device 100, which is then attached to the bottom of an upper portion 101 of the device 100. The sample 104 is thus within an internal cavity or volume of the capture device 100, providing a controlled environment in which photometric stereo imaging techniques can be used to synthesize 3D topographical surface images of the sample 104 from captured 2D topographical surface images of the sample 104.

In the mode of example operation of FIG. 1B, the tray 102 has been detached and removed from the bottom of the upper portion 101 of the 3D topographical surface capture device 100. A mount 152, such as a tripod in the example, has been attached to the other end of the upper portion 101 of the capture device 100 and moved or adjusted so that the device 100 can be placed adjacent to and abut a sample 154. A portion of the sample 154 is therefore effectively within the internal cavity or volume of the capture device 100, in that the sample 154 is subjected to a controlled environment in which photometric stereo imaging techniques can again be used to capture 2D topographical surface images of the sample 154 from which a 3D topographical surface image of the sample 154 can be synthesized.

The 3D topographical surface capture device 100 is portable, permitting its usage to capture 3D topographical surface images of samples, such as the sample 154, that are too large and/or immovable to otherwise be moved to the location of the capture device 100 and placed in the tray 102. The capture device 100 can be completely self-contained, including sufficient components to perform photometric stereo imaging to resultantly generate and store 3D topographical surface images of samples without the need for any other device, such as a host computing device. The stored images may then be later transmitted to other devices.

Figure 2A:
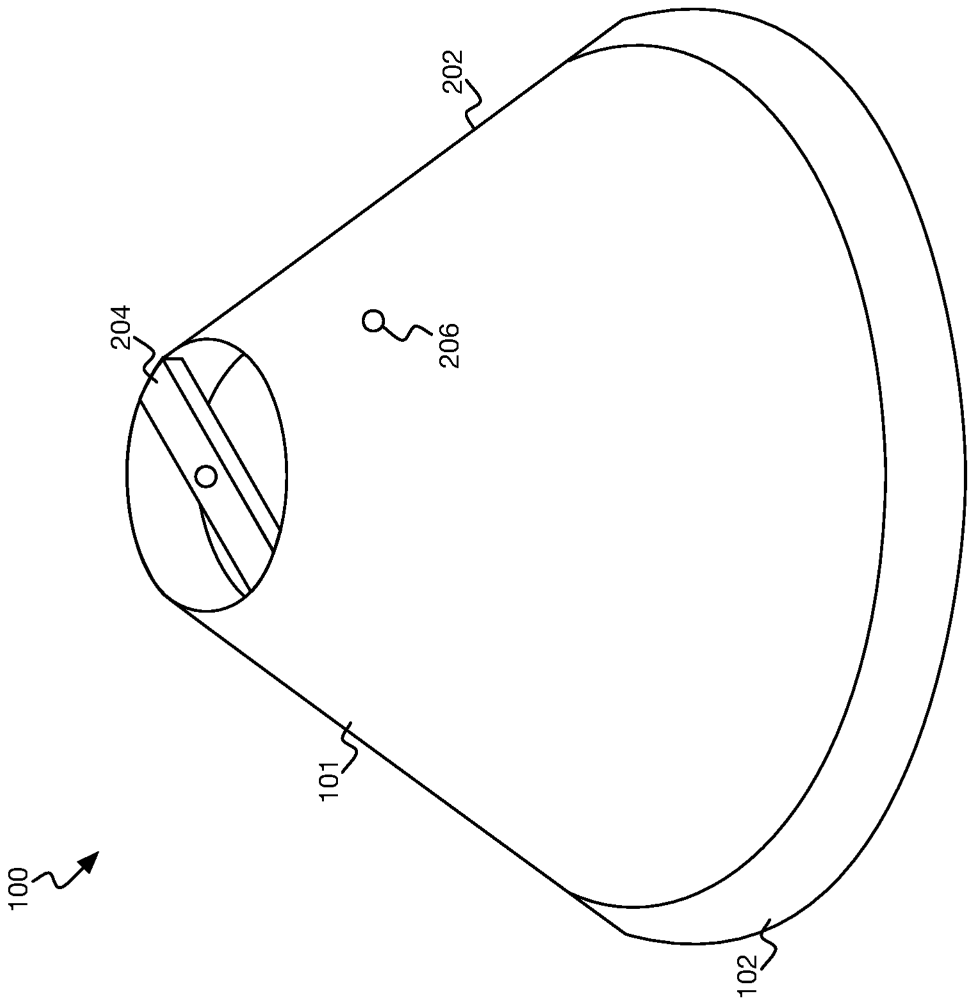
FIGS. 2A, 2B, and 2C are perspective, exploded perspective, and cross-sectional diagrams, respectively, of an example 3D topographical surface capture device operable in the two different modes of FIGS. 1A and 1B.
Figure 2B:
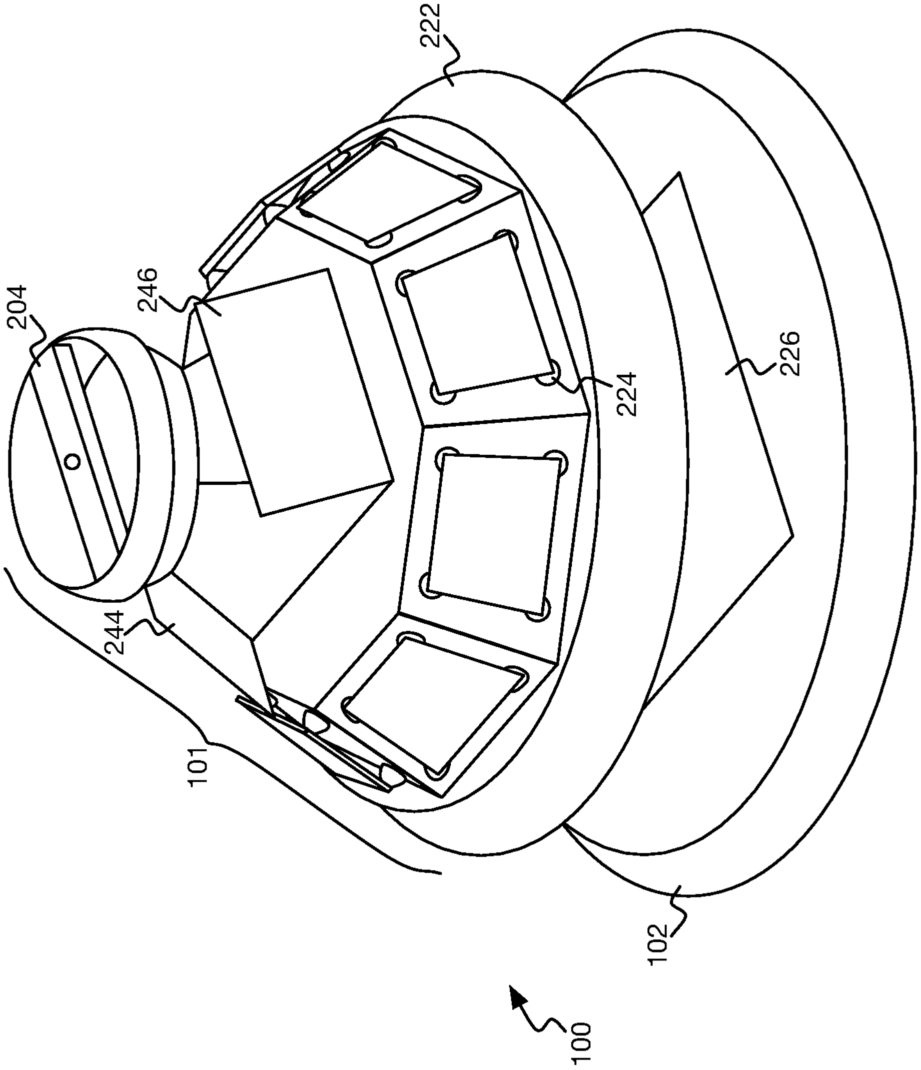
Figure 2C:
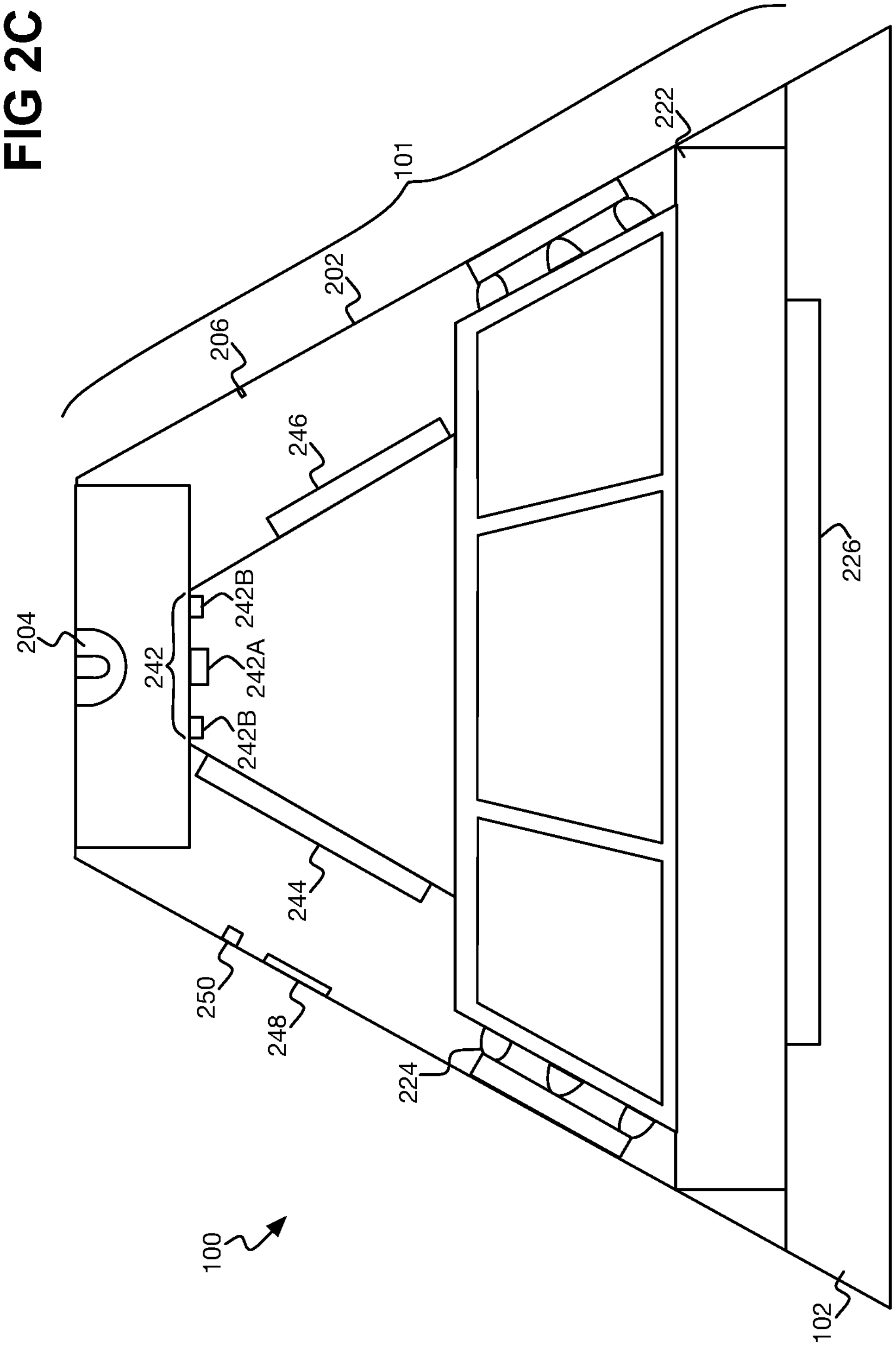

FIGS. 2A, 2B, and 2C show perspective, exploded perspective, and cross-sectional diagrams, respectively, of the example 3D topographical surface capture device 100. In FIG. 2A, the tray 102 is removably attached to the upper portion 101 of the capture device 100, and a cover 202 covers and hides from view internal components of the upper portion 101. In FIG. 2B, the tray 102 is shown in detached manner relative to the upper portion 101 of the capture device 100, and the cover 202 also has been removed from the upper portion 101. In FIG. 2C, the tray 102 is again removably attached to the upper portion 101 of the capture device, and while the cover 202 is shown in FIG. 2C, the cross-sectional nature of the diagram shows the internal components otherwise hidden by the cover 202.

The 3D topographical surface capture device 100 includes a housing 222, which may also be referred to as a frame, and which is covered by the cover 202. The housing 222 extends from the bottom of the upper portion 101 of the capture device 100 to the top of the upper portion 101 of the device 100. The housing 222 may be constructed as a single integrated fixture, or as multiple pieces that are attached to one another. The housing 222 may be made from a rigid plastic, metal, or other material.

The 3D topographical surface capture device 100 includes the tray 102 that is removably attachable to the bottom end of the housing 222. The tray 102 may be fabricated from the same or different material as the housing 222. The tray 102 may be removably attachable to the housing 222 in a magnetic or mechanical manner. As an example of the latter, the tray 102 may have prongs that snap into corresponding hole of the housing 222 when the tray 102 is aligned with the housing 222 and pushed against the housing 222. As another example, the tray 102 may have a protrusion that is fitted into a corresponding groove of the housing 222 when the tray 102 is aligned with the housing 222, where subsequent rotation of the tray 102 locks the tray 102 in place. As a third example, screws may be employed to secure the tray 102 to the housing 222.

The tray 102 includes a sample surface 226 on which the sample 104 is fixed during usage of the 3D topographical surface capture device 100 in the operation mode of FIG. 1A. The sample 104 may be fixed to the sample surface 226 of the tray 102 in a number of different ways. As an example, the sample 104 may be adhesively affixed to the sample surface 226. As another example, the sample 104 may instead be held into place with physical clips that form part of the tray 102.

The 3D topographical surface capture device 100 includes light sources 224 mounted around the perimeter of the housing 222. The light sources 224 may be in the form of groups of light-emitting diodes (LEDs) with top-mounted heat sinks, and may be linearly polarized. The light sources 224 directionally project light into the interior cavity or volume of the housing 222 to illuminate the sample 104 or 154. The light sources 224 can be individually controlled. For instance, the LEDs that are oriented along the same direction relative to the housing 222 form a light source 224 that can be controlled independently of the light sources 224 formed by the LEDs oriented along other directions relative to the housing 222.

The 3D topographical surface capture device 100 includes an imaging subassembly 242 mounted at a top end of the housing 222. The imaging subassembly 242 includes an image capture sensor 242A and one or multiple polarization-state viewers 242B that are directed inward into the interior cavity or volume of the housing 222 and thus towards the sample 104 or 154. The image capture sensor 242A may be of the type of those found in smartphones, which are ordinarily not used in 3D topographical surface capture devices. As one example, the image capture sensor 242A may be an autofocus, wide-angle camera device having autofocus and optical image stabilization (OIS). The polarization-state viewers 242B may be mechanical linear polarizer (LP) mechanisms such as rotatable polarizer wheels, or solid-state liquid crystal (LC) phase retarders with LP. The polarization-state viewers 242B polarize the light captured by the image capture sensor 242A.

The 3D topographical surface capture device 100 includes mounting hardware 204 that is mounted to or that is part of the housing 222, and an output indicator 206 that is visible through the cover 202. The mounting hardware 204 may be in the form of a threaded hole, to attach the housing 222 and therefore the capture device 100 to a mount 152, such as a tripod, to fixedly place the bottom end of the housing 222 so that it abuts a sample 154 in the mode of operation of FIG. 1B. The output indicator 206 may be an LED in one implementation.

Figure 3:
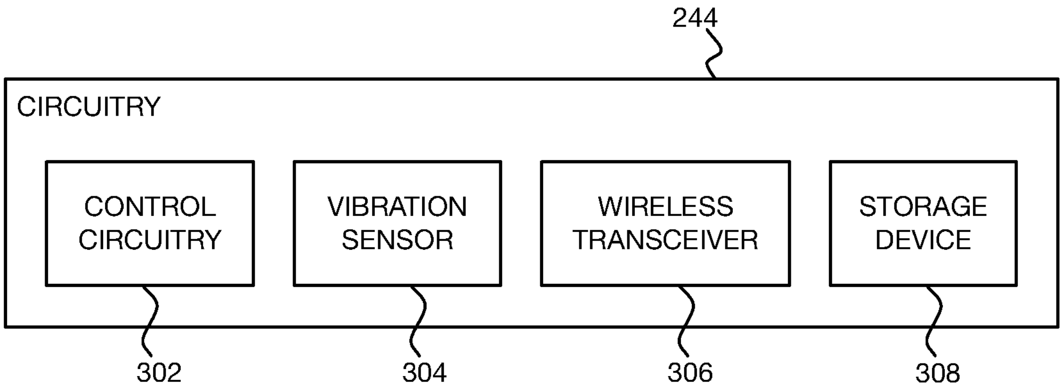
FIG. 3 is a block diagram of example circuitry that can be employed in the 3D topographical surface capture device of FIGS. 2A, 2B, and 2C.

The 3D topographical surface capture device 100 includes circuitry 244 mounted to the housing 222. FIG. 3 shows a block diagram of example such circuitry 244 in one implementation. Specifically, the circuitry 244 can include control circuitry 302, and may also include a vibration sensor 304, a wireless transceiver 306, and/or a storage device 308. The control circuitry 302 is the circuitry that controls the imaging subassembly 242 and the light sources 224 to capture multiple 2D images of the sample 104 in the first mode of FIG. 1A or the sample 154 in the second mode of FIG. 1B under different lighting conditions. The control circuitry 302 then synthesizes or generates—and the capture device 100 thus effectively captures—a 3D topographical surface image of the sample 104 or 154 in question, using photometric stereo imaging techniques.

For example, to capture images of the sample 104 or 154 under different lighting conditions, the control circuitry 302 may selectively turn on different light sources 224, either individually or in different groups, and cause the image capture sensor 242A to capture 2D topographical surface images of the sample 104 or 154 at different polarizations via controlling the polarization-state viewers 242B. Once the requisite images under such different lighting conditions have been captured, the control circuitry 302 may then synthesize the captured 2D images into a 3D topographical surface image of the sample 104 or 154. A given lighting condition is controlled by two factors: the intensity of and which light sources 224 were on when an image was captured, and the polarization of the polarization-stated viewers 242B by which the image capture sensor 242A resultantly captured the image.

In synthesizing the 3D topographical surface image of the sample 104 or 154 from multiple captured 2D topographical surface images, the control circuitry 302 can account for the orientation and color of a changing illuminating light source (i.e., the light sources 224 in aggregate). The control circuitry 302 may computationally generate metadata from the captured 2D topographical surface images as well. For example, such metadata can be with regards to surface reflection properties of the sample, and/or with regards to transmissive light properties of the sample. In this case, too, the control circuitry 302 can account for the orientation and color of a changing illuminating light source.

The control circuitry 302 can be implemented as a processor and memory or other non-transitory computer-readable data storage medium storing program code executable by the processor. The processor and memory may be integrated within an application-specific integrated circuit (ASIC) in the case in which the processor is a special-purpose processor. The processor may instead be a general-purpose processor, such as a central processing unit (CPU), in which case the memory may be a separate semiconductor or other type of volatile or non-volatile memory.

The vibration sensor 304 detects vibrations of the 3D topographical surface capture device 100. The vibration sensor 304 may be in the form of a triple-axis or other type of accelerometer. Vibrations to which the capture device 100 are subjected can negatively impact the accuracy and precision of the captured 2D images, resulting in synthesis degraded 3D topographical surface images of samples. In one implementation, when the vibration sensor 304 detects vibrations greater than a threshold that can impact 3D topographical surface image capture, the output indicator 206 is illuminated to denote this, so as to notify the user of the capture device 100. In the same or different implementation, the control circuitry will control the light sources 224 and the lighting subassembly 242 to capture 2D images just in response to the detected vibrations being less than the threshold.

The wireless transceiver 306 permits other devices to wirelessly communicate with the 3D topographical surface capture device 100. For example, the wireless transceiver 306 may be a Wi-Fi, Bluetooth, or an NFC transceiver, permitting another device to directly or indirectly communicate with the capture device 100. Examples of direct wireless interconnections include peer-to-peer Bluetooth connections, NFC connections, Wi-Fi Direct connections, or ad hoc Wi-Fi networks. Examples of the indirect wireless interconnections include the capture device 100 joining a wireless local-area network (WLAN) to communicate with another device, either over the WLAN directly or via another network to which the WLAN is communicatively connected, such as the Internet.

As noted, the 3D topographical surface capture device 100 can be independently operable in both the mode of FIG. 1A and the mode of FIG. 1B without requiring communicative or conductive connection with any other device to capture 3D topographical surface images. However, communicative connection with another device via the wireless transceiver 306 can permit the capture device 100 to instead or also be operated under the control of another device. Communicative connection with another device via the wireless transceiver 306 can also permit the capture device 100 to transmit the synthesized 3D topographical surface images and/or computationally generated metadata to another device.

The storage device 308 may be a solid-state drive (SSD) or another type of storage device. The storage device 308 stores the 3D topographical surface images. For instance, as the imaging subassembly 242 captures images under different lighting conditions, the imaging subassembly 242 may store the captured 2D images on the storage device 308, either directly or through the control circuitry 302. The control circuitry 302 thereafter retrieves the captured 2D images from the storage device 308 to synthesize the 3D topographical surface images, and then stores them, along with any computationaly generated metadata, on the storage device 308.

Referring back to FIGS. 2A, 2B, and 2C, the 3D topographical surface capture device 100 can include an input mechanism 248 accessible through the cover 202. The input mechanism 248 may be in the form of a physical or capacitive button, and receives an image capture initiation input from a user. The control circuitry 302 thus can initiate control of the light sources 224 and the imaging subassembly 242 to capture 2D topographical surface images and then synthesize 3D topographical surface images in response to the input mechanism 248 receiving such image capture initiation input.

The 3D topographical surface capture device 100 can include a connector 250 accessible through the cover 202. The connector 250 may be a universal serial bus (USB), RJ45, or another type of connector. The connector 250 permits the capture device 100 to communicate with another device in a wired manner, as opposed to a wireless manner as provided by the wireless transceiver 306. For example, the connector 250 may connect to one end of a cable, where the other end of the cable is connected to another device. As another example, the connector 250 may provided for a wired connection to a network to which another device is connected in a wired and/or wireless manner.

The 3D topographical surface capture device 100 includes a battery 246. The battery 246 may be charged through the connector 250, through a different connector accessible through the cover 202, or in an inductive (i.e., wireless) manner. The battery 246 provides for portable usage of the capture device 100 without having to have the device 100 plugged into an external power source, such as a wall outlet. The battery 246 powers the various components of the capture device 100 that have been described, such as the light sources 224, the imaging subassembly 242, and the circuitry 244.

Figure 4:
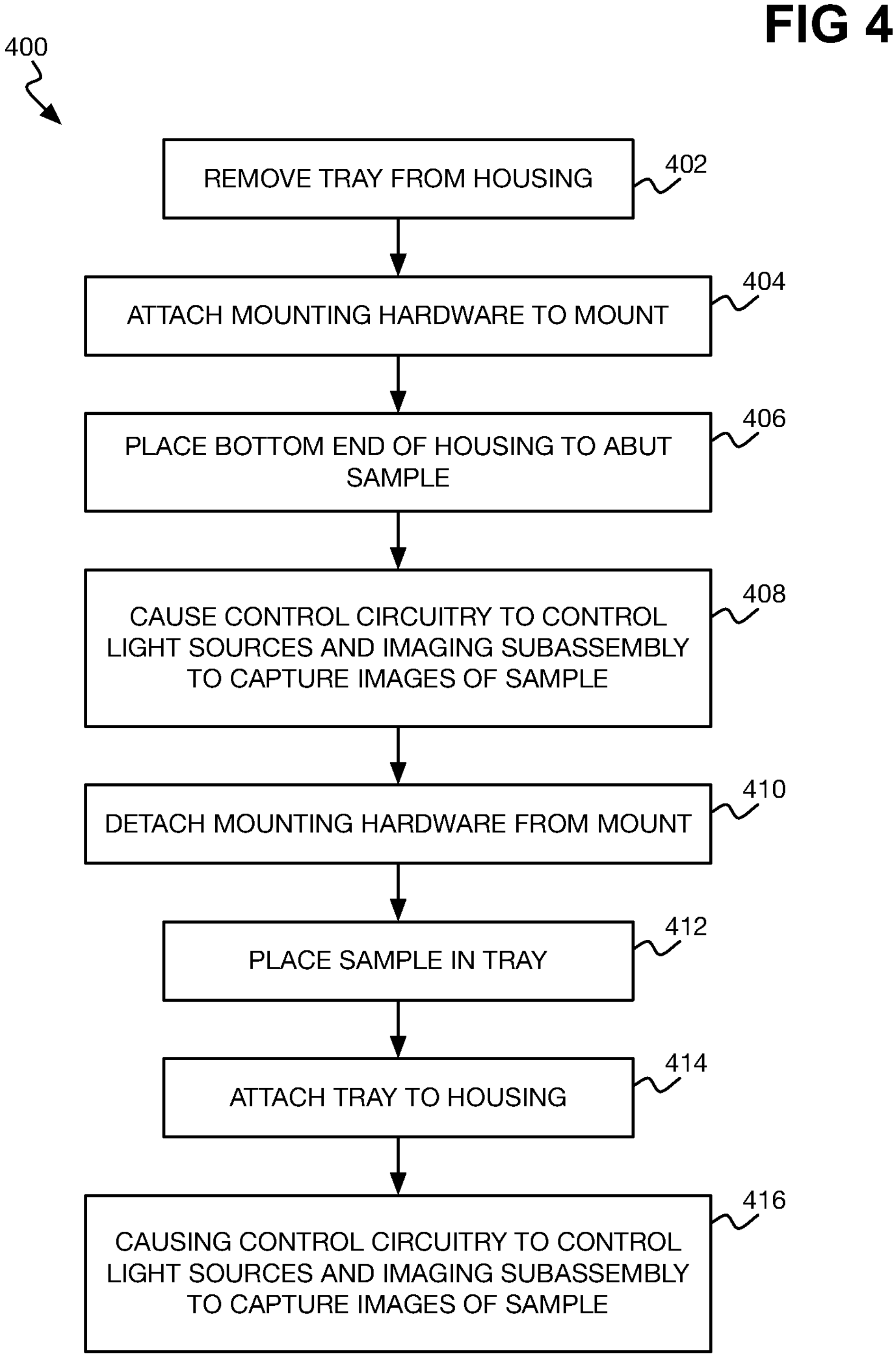
FIG. 4 is a flowchart of an example method of use of the 3D topographical surface capture device of FIGS. 2A, 2B, and 2C in the two different modes of FIGS. 1A and 1B.

FIG. 4 shows an example method 400 of use of the 3D topographical surface capture device 100 in the mode of operation of FIG. 1B, followed by the mode of operation of FIG. 1A. To operate the capture device 100 in the mode of FIG. 1B, and assuming that the tray 102 is currently attached to the housing 222 of the capture device 100, the tray 102 is first removed from the housing 222 (402). A mount 152, such as a tripod, may be attached to the mounting hardware 204 of the capture device 100 (404), with the capture device 100 then located so that the bottom end of the housing 222 is placed to adjacently abut the sample 154 (406).

The control circuitry 302 of the 3D topographical surface capture device 100 is then caused to control the light sources 224 and the imaging subassembly 242 so that 2D topographical surface images of the sample 154 are ultimately captured in the operation mode of FIG. 1B (408). For example, the input mechanism 248 may be actuated by a user to initiate image capture. As another example, such image capture initiation input may be provided via another device communicatively connected to the capture device 100 via the wireless transceiver 306 or the connector 250. 3D topographical surface images may then be synthesized, and other metadata computationally produced, from the captured 2D images.

To then operate the 3D topographical surface capture device 100 in the mode of operation of FIG. 1A, the mounting hardware 204 of the capture device 100 may first be removed from a mount 152 if currently attached to one (410). Assuming that the tray 102 is currently detached from the housing 222, the sample 104 is placed (e.g., fixed) to the sample surface 226 of the tray 102 (412), and the tray 102 removably attached to the housing 222 (414). The control circuitry 302 of the 3D topographical surface capture device 100 is then caused to control the light sources 224 and the imaging subassembly 242 so that 2D topographical surface images of the sample 154 are captured in the operation mode of FIG. 1A (416), which may be initiated as in the operation mode of FIG. 1B. 3D topographical surface images may then similarly be synthesized, and other metadata computationally produced, from the captured 2D images.

Figure 5:
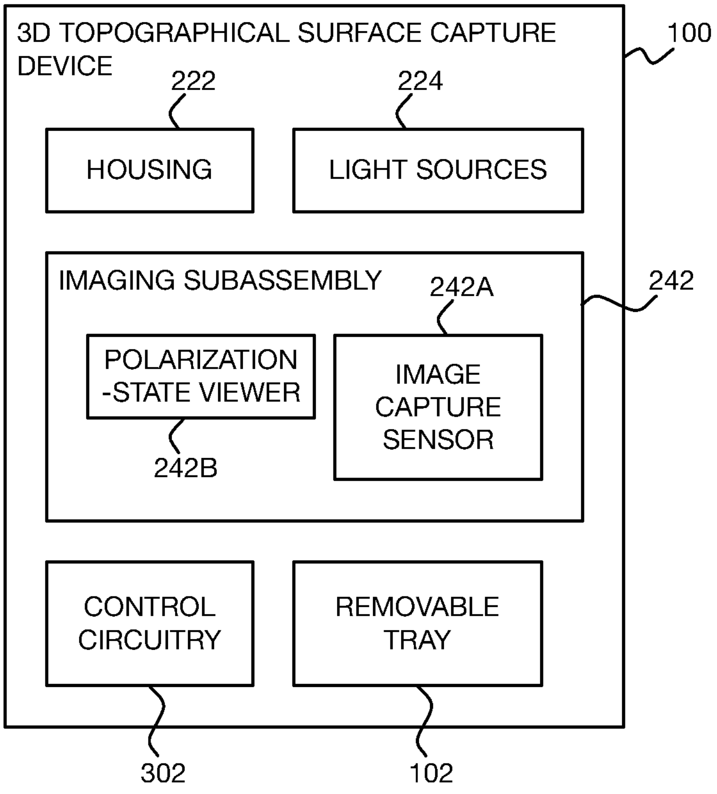
FIG. 5 is a block diagram of an example 3D topographical surface capture device.

FIG. 5 shows a block diagram of the example 3D topographical surface capture device 100. The capture device 100 includes a housing 222, and light sources 224 mounted around a perimeter of the housing 222. The capture device 100 includes an imaging subassembly 242 including a polarization-state viewer 242B and an image capture sensor 242A mounted to a top end of the housing 222 and directed inward into the housing 222. The capture device 100 includes control circuitry 302 to control the light sources 224 and the imaging subassembly 242 to capture 3D topographical surface images of a sample 104 or 154 at a bottom end of the housing 222.

The 3D topographical surface capture device 100 includes a tray 102 removably attached to a bottom end of the housing 222 to switchably configure the capture device 100 between a first mode of FIG. 1A and a second mode of FIG. 1B. In the first mode, the tray 102 is attached to the bottom end of the housing 222 and the sample 104 is attached to the tray 102. In the second mode, the tray 102 is removed from the bottom end of the housing 222 and the bottom end of the housing 222 is placed to abut the sample 154.

In the mode of FIG. 1B in particular, therefore, the capture device 100 can thus be used to capture 2D topographical surface images of a sample 154 that is too large too fit in the device 100 (i.e., on the tray 102 thereof) and/or that is immovable. The capture device 100 can be operated fully independently to capture such images, and then synthesize 3D topographical surface images and generate other metadata, without having to be communicatively or conductively connected to any other device, and without having to be plugged into an external power source. The capture device 100 thus provides for a portable and self-contained way by which to synthesize 3D topographical surface images using photometric stereo imaging and other physically based rendering (PBR) techniques.

We claim:

1. A three-dimensional (3D) topographical surface capture device comprising:
- a housing;
- light sources mounted around a perimeter of the housing;
- an imaging subassembly including a polarization-state viewer and an image capture sensor mounted to a top end of the housing and directed inward into the housing;
- control circuitry to control the light sources and the imaging subassembly to capture two-dimensional (2D) topographical surface images from multiple lighting orientations of a sample at a bottom end of the housing and to synthesize a 3D topographical surface image of the sample from the 2D topographical surface images; and
- a tray removably attached to the bottom end of the housing to switchably configure the 3D topographical surface capture device between:
  - a first mode in which the tray is attached to the bottom end of the housing and the sample is attached to the tray; and
  - a second mode in which the tray is removed from the bottom end of the housing and the bottom end of the housing is placed to abut the sample.

2. The 3D topographical surface capture device of claim 1, further comprising:
- mounting hardware mounted to or that is part of the housing, to attach the housing to a mount to fixedly place the bottom end of the housing to abut the sample in the second mode.

3. The 3D topographical surface capture device of claim 2, further comprising:
- a vibration sensor mounted to the housing to detect vibrations of the 3D topographical surface capture device.

4. The 3D topographical surface capture device of claim 3, further comprising:
- an output indicator to denote whether the detected vibrations are greater than a threshold.

5. The 3D topographical surface capture device of claim 3, wherein the control circuitry is to control the light sources and the imaging subassembly to capture the 2D topographical surface images of the sample just in response to the detected vibrations being less than a threshold.

6. The 3D topographical surface capture device of claim 1, further comprising one or multiple of:
- an input mechanism to receive an image capture initiation input, wherein the control circuitry is to initiate control of the light sources and the imaging subassembly to capture the 2D topographical surface images of the sample in response to the image capture initiation input;
- a storage device mounted to the housing, wherein the control circuitry stores the 2D topographical surface images of the sample;
- a battery mounted to the housing to power the light sources, the imaging subassembly, and the control circuitry;
- a wireless transceiver mounted to the housing to wirelessly communicate with a device other than the 3D topographical surface capture device; and
- a connector to communicate with the device other than the 3D topographical surface capture device in a wired manner.

7. The 3D topographical surface capture device of claim 6, wherein the 3D topographical surface capture device is independently operable in both the first and second modes without requiring communicative or conductive connection with any other device to capture the 2D topographical surface images of the sample.

8. The 3D topographical surface capture device of claim 1, wherein the control circuitry is further to computationally generate metadata regarding surface reflection properties of the sample from the 2D topographical surface images.

9. The 3D topographical surfaced surface capture device of claim 1, wherein the control circuitry is further to computationally generate metadata regarding transmissive light properties of the sample from the 2D topographical surface images.

10. The 3D topographical surface capture device of claim 1, further comprising a cover coupled to the housing and covering internal components of the housing.

11. The 3D topographical surface capture device of claim 1, wherein the tray is removably attachable to the housing in a magnetic manner.

12. A method comprising:
- removing a tray removably attached to a bottom end of a housing of a three-dimensional (3D) topographical surface capture device comprising light sources mounted around a perimeter of the housing and an imaging subassembly including a polarization-state viewer and an image capture sensor mounted to a top end of the housing and directed inward into the housing;
- placing the bottom end of the housing to abut a sample; and
- causing control circuitry of the 3D topographical surface capture device to control the light sources and the imaging subassembly to capture two-dimensional (2D) topographical surface images of the sample at the bottom end of the housing and to synthesize a 3D topographical surface image of the sample from the 2D topographical surface images in a mode of the 3D topographical surface capture device.

13. The method of claim 12, further comprising:
- attaching mounting hardware of the 3D topographical surface capture device that is mounted to or that is part of the housing to a mount, wherein placing the bottom end of the housing to abut the sample comprises moving or adjusting the mount so that the bottom end of the housing abuts the sample.

14. The method of claim 12, wherein the mode is a second mode, and the method further comprises:

placing a different sample in the tray;

removably attaching the tray to the bottom end of the housing; and controlling the control circuitry to control the light sources and the imaging subassembly to capture 2D topographical surface images of the different sample at the bottom end of the housing in a first mode of the 3D topographical surface capture device.

15. The method of claim 12, wherein the 3D topographical surface capture device further comprises:

an input mechanism to receive an image capture initiation input;

a storage device to store the 3D topographical surface image of the sample;

a battery mounted to power the light sources, the imaging subassembly, and the control circuitry; and a communication mechanism to communicate with a device other than the 3D topographical surface capture device.

16. The method of claim 15, wherein the 3D topographical surface capture device is independently operable in the mode without requiring communicative or conductive connection with any other device to capture the 3D topographical surface image of the sample.

17. The method of claim 15, further comprising:

detecting, via a vibration sensor, vibrations of the 3D topographical surface capture device; and notifying, via an output indicator, a user when the detected vibrations are greater than a threshold.

18. The method of claim 12, wherein the control circuitry further generates, from the 2D topographical surface images, either or both of:

metadata regarding surface reflection properties of the sample; and metadata regarding transmissive light properties of the sample from the 2D topographical surface images.

19. The method of claim 12, wherein synthesizing the 3D topographical surface image of the sample from the 2D topographical surface images includes accounting for an orientation and color of a changing illuminating light source.

20. The method of claim 12, wherein causing the control circuitry to control the light sources and the imaging subassembly to capture 2D topographical surface images further comprises:

controlling the polarization-state viewer at different polarizations; or selectively turning on different ones of the light sources.

* * * * *